(No Model.)
R. PARKER.
AXLE LUBRICATOR FOR VEHICLE HUBS.
No. 504,816. Patented Sept. 12, 1893.
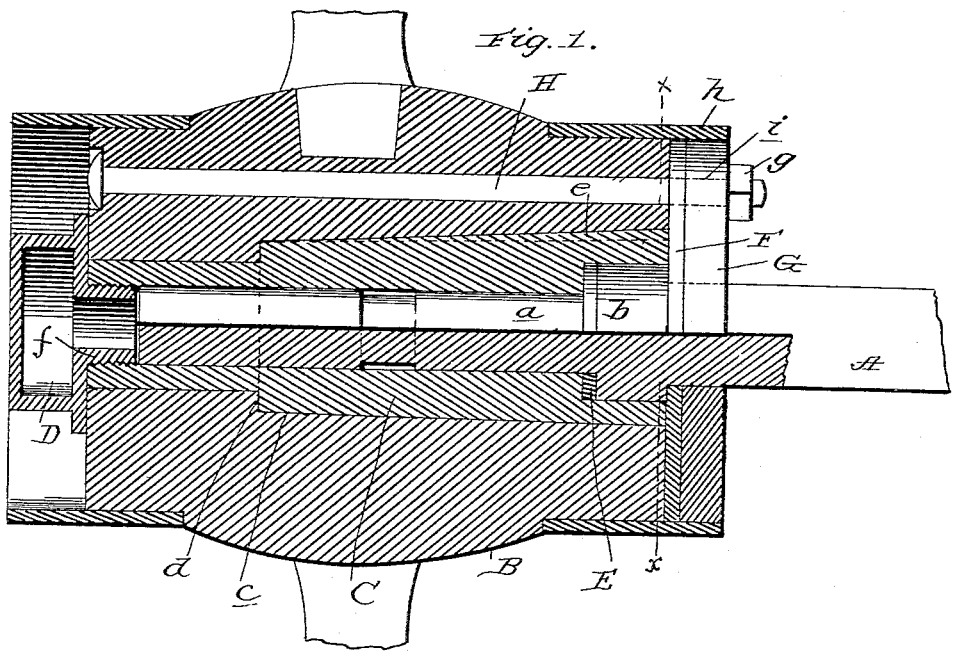
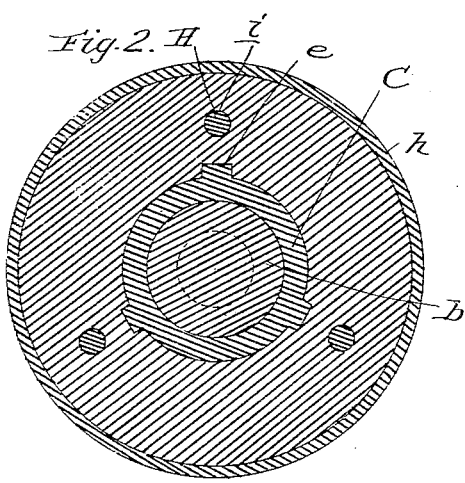
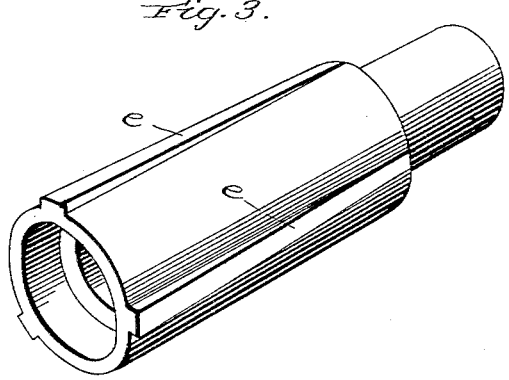
Witnesses:
Inventor
Robert Parker
By James J. Shelly
Attorney

UNITED STATES PATENT OFFICE.

ROBERT PARKER, OF PEKAY, IOWA.

AXLE-LUBRICATOR FOR VEHICLE-HUBS.

SPECIFICATION forming part of Letters Patent No. 504,816, dated September 12, 1893.

Application filed April 17, 1893. Serial No. 470,670. (No model.)

*To all whom it may concern:*

Be it known that I, ROBERT PARKER, a citizen of the United States, residing at Pekay, in the county of Mahaska and State of Iowa, have invented certain new and useful Improvements in Axle-Lubricators for Vehicle-Hubs; and I do declare the following to be a full, clear, and exact description of the invention, such as will enable others skilled in the art to which it appertains to make and use the same.

My invention relates to improvements in axle lubricators for vehicle wheel hubs, and it has for its general object to provide a hub adapted to contain a large quantity of lubricant and prevent waste thereof, and one which may be readily charged with lubricant without removing it from the axle upon which it is mounted.

Another object of the invention is to provide a hub embodying such a construction that all of the parts subjected to frictional wear, may be readily removed when damaged, and new parts placed in position without injury to the other parts.

Still another object of the invention is to provide a hub so constructed that sand or other gritty substance will be excluded from the interior thereof.

With the foregoing objects in view, the invention will be fully understood from the following description and claim, when taken in connection with the accompanying drawings, in which—

Figure 1, is a diametrical section of a hub embodying my invention. Fig. 2, is a transverse section taken in the plane indicated by the line $x$, $x$, of Fig. 1, and Fig. 3, is a perspective view of the removable box, removed.

In the drawings:—A, indicates an axle which is provided with the usual spindle $a$, having the collar $b$; and B, indicates the body of my improved hub. This body B, is provided with a longitudinal central bore $c$, which is designed to receive the axle box C, and has its outer portion reduced as shown so as to afford an abutment for the shoulder $d$, of said axle box. The box C, which is placed loosely in the body so that it may be readily removed when worn or damaged, is provided upon its exterior with a series of longitudinal ribs $e$, which are designed and adapted to engage corresponding grooves in the bore $c$, so as to prevent the box from turning within the body.

As better illustrated in Fig. 1, of the drawings, the outer end of the tubular box C, is interiorly threaded for the engagement of the exteriorly threaded tube $f$, of the hollow lubricant reservoir D. This reservoir serves to contain a quantity of oil or other lubricant which is fed gradually to the interior of the box C, and it serves in addition to holding the lubricant, to prevent the entrance of dust into the outer end of the said box. By reason of the reservoir D, being connected to the box C, in the manner illustrated and described, it will be seen that said reservoir may be readily removed to replenish its supply of lubricant, and thus the hub may be kept thoroughly lubricated without removing it from the axle, which is an important advantage.

In order to retain the oil or lubricant upon the axle spindle, I provide in the inner enlarged end of the bore of the box C, a leather washer E, which rests against the collar $b$, as shown; and in order to prevent the entrance of dust, sand, &c., into the interior of the box, I provide the dust guard F, which is also preferably formed from leather. This dust guard is mounted upon the axle and bears against the inner end of the body B, and it is held tightly against the same through the medium of the metallic washer or plate G.

The metallic washer G, and the dust guard F, rest within and engage the inner surface of the hub thimble $h$, and they are provided preferably at equi-distant points with three, more or less, aligned apertures $i$, for the passage of the longitudinal connecting bolts H, which take through the body B, from end to end and are preferably secured at their inner ends by the nuts $g$. These bolts H, serve to effect a tight and strong connection of the dust guard F, and plate G, to the body B, and consequently they serve to hold the body in position upon the axle spindle. By reason of the dust guard F, and washer G, being arranged within the thimble $h$, and in engagement with the inner surface thereof, it will be readily perceived that the entrance of dust between the washer F, and the end of the hub is effectually prevented, which is an important desideratum.

My improved hub may be removed from the axle for the purposes of repairs, &c., almost as readily as a hub secured in the ordinary manner, it being simply necessary to move the nuts $g$, and pull the body outwardly. Likewise the hub may be readily placed in position by sliding it upon the axle spindle and guiding the bolts H, through the apertures in the plates F, and G, and securing them by the nuts $g$, which nuts serve to hold both plates well within the thimble $h$, so as to effectually exclude the dust and sand.

It will be readily perceived from the foregoing description taken in connection with the drawings, that with all of its advantages, my improved hub is exceedingly simple and durable, and that it may be manufactured almost as cheaply as the ordinary hubs at present in common use.

Having described my invention, what I claim is—

In a wheel hub, the combination with the body, and an axle box arranged within the same and having interior threads at its outer end; of an oil reservoir D, having a tubular and exteriorly threaded extension adapted to enter the axle box and engage the threads thereof; the said tubular extension being adapted to feed oil to the axle box and being also adapted to engage the end of an axle spindle when the hub is placed thereon so as to prevent play of the hub, substantially as specified.

In testimony whereof I affix my signature in presence of two witnesses.

ROBERT PARKER.

Witnesses:
A. F. KINDALL,
RALPH CHAMBERLAIN.